(12) United States Patent
Shinoda et al.

(10) Patent No.: US 10,312,824 B2
(45) Date of Patent: Jun. 4, 2019

(54) MODULAR MULTILEVEL CONVERTER, METHOD AND CONTROL MODULE FOR CONTROLLING THE SAME

(71) Applicants: SUPERGRID INSTITUTE, Villeurbanne (FR); INSTITUT NATIONAL DES SCIENCES APPLIQUEES DE LYON, Villeurbanne (FR); CENTRALSUPELEC, Gif-sur-Yvette (FR)

(72) Inventors: Kosei Shinoda, Lyons (FR); Abdelkrim Benchaib, Montigny le Bretonneux (FR); Xavier Guillaud, Bachy (FR); Jing Dai, Gif-sur-Yvette (FR)

(73) Assignees: SUPERGRID INSTITUTE, Villeurbanne (FR); INSTITUT NATIONAL DES SCIENCES APPLIQUEES DE LYON, Villeurbanne (FR); CENTRALESUPELEC, Gif-sur-Yvette (FR)

( * ) Notice: Subject to any disclaimer, the term of this patent is extended or adjusted under 35 U.S.C. 154(b) by 0 days.

(21) Appl. No.: 15/749,829

(22) PCT Filed: Jul. 29, 2016

(86) PCT No.: PCT/FR2016/051993
§ 371 (c)(1),
(2) Date: Feb. 2, 2018

(87) PCT Pub. No.: WO2017/021642
PCT Pub. Date: Feb. 9, 2017

(65) Prior Publication Data
US 2018/0226898 A1 Aug. 9, 2018

(30) Foreign Application Priority Data

Aug. 3, 2015 (FR) .................................. 15 57501

(51) Int. Cl.
H02M 7/483 (2007.01)
H02M 7/217 (2006.01)
(Continued)

(52) U.S. Cl.
CPC ........... H02M 7/483 (2013.01); H02M 7/217 (2013.01); *H02M 7/538466* (2013.01); *H02M 2001/0003* (2013.01); *H02M 2007/4835* (2013.01)

(58) Field of Classification Search
None
See application file for complete search history.

(56) References Cited

U.S. PATENT DOCUMENTS

2011/0285437 A1* 11/2011 Benchaib ............ H02J 3/1857
327/156
2012/0191391 A1* 7/2012 Angquist ............ H02M 7/483
702/64
(Continued)

OTHER PUBLICATIONS

S. Samimi et al Control of a DC bus voltage with a Modular Multilevel Converter 2015 IEE Eindhoven Powertech, Jun. 1, 2015, pp. 1-6 XP055278812 DOI: 10.1109/PTC.2015.7232570, ISBN: 978-1-4799-7693-5.

(Continued)

*Primary Examiner* — Jeffrey A Gblende
(74) *Attorney, Agent, or Firm* — Workman Nydegger

(57) ABSTRACT

The invention relates to a modular multilevel converter (2) having a control module (4) and a computer (10) for computing a setpoint for the internal energy of the converter stored in the capacitors of the submodules of the arms. The control module is configured to deduce, from the setpoint for (Continued)

the internal energy of the converter, a setpoint for the voltage across the terminals of each modeled capacitor, which setpoint is used for regulating the voltage across the points of common coupling between the converter and the DC power supply network and the voltage across the terminals of each modeled capacitor.

16 Claims, 11 Drawing Sheets

(51) Int. Cl.
  *H02M 7/53846* (2007.01)
  *H02M 1/00* (2006.01)

(56) References Cited

U.S. PATENT DOCUMENTS

2013/0027995 A1* 1/2013 Harnefors ............. H02M 1/126
  363/40
2014/0146586 A1* 5/2014 Das ........................ H02M 1/36
  363/49

OTHER PUBLICATIONS

S. Samimi et al Synthesis of different types of energy based controllers for a Modular Multilevel Converter integrated in an HVDC link 11th IET International Conference on AC and DC Power Transmission 2015: Birmingham, United Kingdom, Feb. 10-12, 2015 Jan. 1, 2015, XP055278671, Stevenage, UK.

* cited by examiner

MODULAR MULTILEVEL CONVERTER, METHOD AND CONTROL MODULE FOR CONTROLLING THE SAME

FIELD

The present disclosure relates to the technical field of modular multilevel converters (MMCs) for converting alternating current (AC) into direct current (DC) and vice versa.

More precisely, the disclosure relates to high voltage DC (HVDC) transport networks that use DC for transmitting electrical energy and in which stations incorporate modular multilevel converters.

BACKGROUND

FIG. 1 is a diagram showing a set of submodules 6 of a modular multilevel converter 2 of the prior art. For three-phase input/output currents (having three phases φa, φb, and φc), the converter 2 has three conversion legs that are referenced by indices a, b, and c for the various components in FIG. 1. Each conversion leg comprises an upper arm and a lower arm (indicated by indices "u" for upper and "l" for lower), each connecting a DC+ or DC− terminal of the DC power supply network to a terminal of the AC power supply network. In particular, each of the legs is connected to one of the three phase lines φa, φb, or φc of the AC power supply network. FIG. 1 shows a set of submodules 6, in which each arm comprises a plurality of submodules $SM_{xij}$ that can be controlled in a desired sequence (where x indicates whether the arm is an upper or lower arm, i indicates the number of the leg, and j indicates the number of the submodule in the submodules in series in the leg). In this example, only three submodules are shown per arm. In practice, each lower or upper arm may have a number N of several tens to several hundreds of submodules. Each submodule $SM_{xij}$ includes an energy storage system such as at least one capacitor and a control member for connecting the capacitor selectively in series between the terminals of the submodule or for bypassing it. The submodules are controlled in a selected sequence in order to vary progressively the number of energy storage elements that are connected in series in an arm of the converter 2 so as to provide a plurality of voltage levels. In addition, in FIG. 1, $v_{dc}$ designates the voltage at the point where the converter is connected to the DC power supply network, these points being referred to as points of common coupling (PCC) as is well known to the person skilled in the art. $i_{dc}$ designates the current in the DC power supply network, whereas currents $i_{ga}$, $i_{gb}$, and $i_{gc}$ flow in the three phase lines φa, φb, and φc. In addition, each arm possesses an inductance $L_{arm}$ and each phase line includes an inductance $L_f$ and a resistance $R_f$.

FIG. 2 shows a prior art submodule $SM_{xij}$ forming part of the FIG. 1 converter. In this submodule, each control member comprises a first electronic switch element T1 such as an insulated gate bipolar transistor (IGBT) connected in series with an electrical energy storage element, specifically a capacitor $C_{SM}$. This first switch element T1 and this capacitor $C_{SM}$ are connected in parallel with a second electronic switch element T2 that is likewise an insulated gate bipolar transistor (IGBT). This second switch element T2 is connected between the inlet and the outlet terminals of the submodule $SM_{xij}$. Each of the first and second switch elements T1 and T2 has an antiparallel diode, as shown in FIG. 2.

In operation, the submodule may be controlled to occupy two control states.

In a first state, referred to as the "ON" state, the first switch element T1 is open and the second switch element T2 is closed, so as to connect the energy storage element $C_{SM}$ in series with the other submodules. In the second state, referred to as the "OFF" state, the first switch element T1 is closed and the second switch element T2 is open so as to short circuit the energy storage element.

It is known that each arm, having a voltage $v_m$ across its terminals may be modeled by a modeled voltage source having a voltage $v_m$ across its terminals and of duty ratio that depends on the number of controlled submodules, and by a modeled capacitor $C_{tot}$ connected to the voltage source. This model is shown in FIG. 3, in which there can be seen an arm and the resulting model. The reciprocal of the capacitance of the model capacitor $C_{tot}$ is equal to the sum of the reciprocals of the capacitances of the controlled submodules, such that:

$$\frac{1}{C_{tot}} = \frac{1}{C_1} + \frac{1}{C_2} + \ldots + \frac{1}{C_N}$$

where $C_1, C_2, \ldots, C_N$ are the capacitances of the $j^{th}$ capacitors.

Thus, the voltage $v_{c\Sigma}$ across the terminals of the modeled capacitor $C_{tot}$ is equal to the sum of the voltages $v_{cj}$ across the terminals of the capacitors of the submodules in the arm (where j goes from 1 to N and indicates the number of the capacitor and thus of the submodule). In the present application, and by abuse of language, $C_{tot}$ designates both the capacitor and its capacitance. By controlling the sequence with which the submodules are controlled so as to cause the number of energy storage elements that are connected in series to vary progressively, the energy of the modeled capacitor $C_{tot}$, and thus the voltage across the terminals of each modeled voltage source, can be decreased or increased.

In the prior art, there is thus an equivalent configuration for the set 6 of submodules of the MMC as shown in FIG. 4. In this figure, the converter is a converter that is analogous to that described with reference to FIG. 1, and in which each arm is replaced by its model. In addition, each phase line is associated with a current $i_{gi}$ and with a voltage $v_{gi}$ (where i gives the number of the leg).

In this example, each of the modeled voltage sources has a voltage $v_{mxi}$ across its terminals, and each modeled capacitor $C_{tot}$ has a voltage $v_{c\Sigma xi}$ across its terminals (where x specifies whether the arm is upper or lower and i gives the number of the leg). It may also be observed that it is possible to consider the MMC as having an imaginary AC portion and an imaginary DC portion (for input or output depending on whether the converter is configured to convert AC energy into DC energy or vice versa), in which the variation of the total energy stored in the capacitors of the submodules is equal to the difference between the power entering the converter and the power leaving it.

Converters of the voltage source converter (VSC) type are known that possess a station capacitor connected in parallel with the DC power supply network. The drawback of such a parallel capacitor is that it does not enable the converter to be decoupled from the voltage of the DC power supply network. In addition, that type of converter requires the use of numerous filters in order to obtain acceptable converted signals.

In addition, the inertia of the DC power supply network depends on its capacitance, such that a large capacitance increases the inertia of the DC power supply network. Thus, a large capacitance of the network, and thus a large inertia of the network, enables it to withstand disturbances better. Conversely, a small capacitance of the network, and thus a small inertia of the network, enables the voltage across the connection points between the converter and the DC power supply network to be regulated more easily and more accurately.

However, and unlike VSC type converters, MMC type converters do not have a station capacitor connected in parallel and capable of having an influence on the stability of the DC power supply network. Modular multilevel converters thus present the advantage of providing decoupling between the total voltage across the capacitors of the submodules and the voltage of the DC power supply network. Nevertheless, merely varying power can lead to a large variation in the voltage of the DC power supply network.

MMC type converters are known in which control is not energy based. In such converters, in the event of a possible voltage difference appearing between the voltage across the capacitors of the arms and the voltage of the DC power supply network, the incoming power of the DC power supply network varies automatically in order to correct said voltage difference. Control is performed without an additional regulator since the exchanges of energy with the capacitors of the arms track the variations in voltage on the DC power supply network.

Nevertheless, all of the variables in converters of that type are not under control, which leads to a lack of robustness for the converter.

Converters are also known in which control is based on energy. In particular, the document entitled "Control of DC bus voltage with a modular multilevel converter" (by Samimi et al., PowerTech Conference 2015) is known and describes a modular multilevel converter having a system for controlling transfers of power in the AC portion, for controlling transfers of power in the DC portion, and for controlling the internal energy of the converter. Such a converter makes use of control that is energy based: controlling electrical variables of the DC power supply network and of the AC power supply network makes it possible to control the powers of those two networks. A difference between the powers of the DC and AC power supply networks leads to a reduction or to an increase in the energy stored in the capacitors of the submodules. Nevertheless, converters of that type are detrimental to decoupling between the voltages across the terminals of the capacitors of the submodules and the voltage of the DC power supply network. Furthermore, it does not make it possible to adapt effectively and in real time to voltage fluctuations on the DC power supply network.

Furthermore, known converters are not sufficiently robust, in particular concerning the contribution to stability of the DC power supply network.

In particular, controlling internal energy constitutes an additional degree of freedom, but no existing technique proposes a solution for regulating effectively the internal energy of the converter.

Existing solutions do not make it possible to make full use of the capacitances of MMC type converters in terms of controlling the internal energy of the converter jointly with controlling the stability of the DC network.

SUMMARY

An object of the present disclosure is to propose a modular multilevel converter (MMC) having a converter control module that makes it possible to make full use of the potential of the MMC by offering better interaction between the internal energy of the converter as stored in the capacitors of the submodules, and the voltage of the DC power supply network. Another advantage of the disclosure is to enable the converter to act more effectively on the inertia of the DC power supply network.

To do this, embodiments of the disclosure relate to a multilevel modular voltage converter for converting an AC voltage into a DC voltage and vice versa, the converter comprising a DC portion for connection to a DC power supply network and an AC portion for connection to an AC power supply network, the converter comprising a plurality of legs, each leg comprising an upper arm and a lower arm, each arm comprising a plurality of submodules that are individually controllable by a control member specific to each submodule, and each submodule comprises a capacitor that is connectable in series in the arm when the control member of the submodule is in an ON state, each arm being suitable for modeling as a modeled voltage source associated with a duty ratio depending on a number of capacitors connected in series in the arm, each modeled voltage source being associated in parallel with a modeled capacitor corresponding to a total capacitance of the arm.

The converter further comprises a converter control module configured to regulate the voltage across the terminals of each modeled capacitor of each leg and to regulate the voltage across the points of common coupling between the converter and the DC power supply network by controlling said control members of the submodules of the converter.

According to a general characteristic of the disclosure, the control module of the converter comprises a computer for computing a setpoint for the internal energy of the converter stored in the capacitors of the submodules of the arms by applying a function having an adjustable input parameter, the control module being configured to deduce from this energy setpoint a setpoint for the voltage across the terminals of each modeled capacitor used for regulating the voltage across the points of common coupling between the converter and the DC power supply network and the voltage across the terminals of each modeled capacitor.

The input parameter of the computer can easily be adjusted at any time by the user. Since the setpoint for the internal energy of the converter depends on the input parameter, it is possible for the user to act directly on the degree the internal energy contributes to the stability of the DC power supply network.

The user can thus adjust the input parameter as a function of disturbances to the DC power supply network and can increase or decrease the inertia of the network as a function of needs.

In non-limiting manner, the contribution on the electrical power supply network of the modular multilevel converter, having its control module provided with such a computer, is equivalent to that of a virtual capacitor connected in parallel with the DC power supply network. By adjusting the adjustable input parameter of the computer, it is possible to vary virtually the capacitance of the virtual capacitor. The advantage is to be able to act on the DC power supply network while maintaining decoupling between the total voltage of the capacitors in the submodules and the voltage of the DC power supply network.

Unlike a capacitor that is actually connected in parallel with the DC power supply network, the virtual capacitor that enables the network to be stabilized is cost-free and cannot be degraded. In particular, the adjustable virtual capacitor may take on very high capacitance values, which is physically not possible for a real capacitor.

Unlike the MMC of the document entitled "Control of DC bus voltage with a modular multilevel converter", the capacitance of the virtual capacitor is adjustable by means of the adjustable parameter. Specifically, in the prior art document, the converter behaves as though six capacitors were connected in parallel with the DC power supply network and the value of the capacitance of those capacitors cannot be adjusted. The converter of the disclosure thus provides better decoupling between the voltages across the terminals of the capacitors of the submodules and the voltage of the DC power supply network. Furthermore, it makes it possible in real time to adapt to voltage fluctuations on the DC power supply network.

The submodules may be controlled by means of two insulated grid bipolar transistors (IGBTs) enabling the capacitor of said submodule to be connected or not connected in series in the associated arm depending on whether it is desired to put the submodule in an ON state or in an OFF state.

Each arm may be modeled by a modeled voltage source connected in parallel with a modeled capacitor of capacitance $C_{tot}$. The sum of the voltages across the capacitors of the submodules of an arm is written $v_{c\Sigma}$, such that the voltage across the terminals of the modeled capacitor connected in parallel with the modeled voltage source is $v_{c\Sigma}$.

The duty ratio $\alpha$ associated with the modeled voltage source may be calculated using the expression:

$$\alpha = \frac{n}{N}$$

where n is the number of submodules that are connected in the ON state in the associated arm, and N is the number of submodules in the arm.

By jointly regulating the voltage across the points of common coupling between the converter and the DC power supply network and the voltage across the terminals of each modeled capacitor, and thus by regulating the internal energy of the converter, it is possible to act on the stability of the DC power supply network.

This makes it possible to contain potential power disturbances that appear suddenly on the DC power supply network and that could lead to major variations in the voltage of said network.

In non-limiting manner, joint regulation of the voltage across the points of common coupling between the converter and the DC power supply network and of the voltages across the terminals of each modeled capacitor may be performed by closed-loop servo-control of those magnitudes by means of setpoint values, in particular a setpoint for the voltage across the points of common coupling between the converter and the DC power supply network. The control module is said to be "slow" in contrast to other control modules that it is used for controlling and that present switching times that are very short.

In addition, the setpoint $v^*_{c\Sigma}$ for the voltage across the terminals of each modeled capacitor, when squared, is proportional to the setpoint $W^*_\Sigma$ for the internal energy as delivered by the user, using the expression:

$$v^{2*}_{c\Sigma} = \frac{2W^*_\Sigma}{6C_{tot}}$$

Said setpoint for the internal energy of the converter and thus said setpoint for the voltage across the terminals of each capacitor, when squared, make it possible to servo-control the voltage of the DC power supply network and the voltage across the terminals of each modeled capacitor.

The adjustable input parameter may be an adjustable virtual inertia coefficient $k_{VI}$. Modifying $k_{VI}$ thus amounts to modifying virtually the magnitude of the capacitance of the virtual capacitor, and thus to contributing to the stability of the DC power supply network. The advantage is to provide an additional degree of freedom in the control of the internal energy of the MMC. The capacitance of the virtual capacitor may in particular take values that are very high, without this requiring additional hardware constraints.

The computer may be configured to compute the internal energy setpoint $W^*_\Sigma$ for the converter using the function:

$$W^*_\Sigma = \tfrac{1}{2} 6 C_{tot} k_{VI} (v_{dc}^2 - v_{dc0}^2) + W^*_{\Sigma 0}$$

where $C_{tot}$ is a total capacitance of the modeled capacitor, $v_{dc}$ is a measured voltage of the DC power supply network, $v_{dc0}$ is a nominal value of the voltage of the DC power supply network, and $W^*_{\Sigma 0}$ is a nominal setpoint for the value of the energy stored in the capacitors of the converter.

It can be understood that the capacitance $C_{VI}$ of the virtual capacitor is expressed as follows:

$$C_{VI} = 6 C_{tot} k_{VI}$$

In addition, the $(v_{dc}^2 - v_{dc0}^2)$ term represents a voltage difference on the DC power supply network, resulting from a voltage disturbance. It can thus be observed that by acting on the adjustable virtual inertia coefficient $k_{VI}$, it is possible to act on variation of the voltage across the points of common coupling between the converter and the DC power supply network.

The control module may include a regulator for regulating the internal energy of the converter, the regulator having as input the result of a comparison between said setpoint for the voltage across the terminals of each modeled capacitor, when squared, and an average of the squares of the voltages across the terminals of the modeled capacitors, and delivering a power setpoint for the capacitors of said converter.

By means of the internal energy regulator, it is thus possible to servo-control the voltage across the terminals of each modeled capacitor, when squared, on the basis of a setpoint value for that voltage. Since the voltage across the terminals of each modeled capacitor, when squared, is proportional to the internal energy of the converter stored in the capacitors of the submodules of the arms, the voltage across the terminals of each modeled capacitor is thus servo-controlled on the basis of the setpoint for the internal energy of the converter stored in the capacitors of the submodules of the arms as supplied by the computer.

The control module may be configured to perform a change of variable in order to control intermediate current and voltage variables $i_{diff}$, $i_{gd}$ and $v_{diff}$, $v_{gd}$, where $i_{diff}$ and $v_{diff}$ are associated with the DC power supply network, and $i_{gd}$ and $v_{dg}$ are associated with the AC power supply network.

The intermediate current variables $i_{diff}$ and $i_{gd}$ can be controlled independently.

In non-limiting manner, for a converter that converts DC energy into AC energy, these variables enable the variation of the internal energy of the converter to be expressed as follows:

$$\frac{dW_\Sigma}{dt} = \sum_{i=1}^{3} 2i_{diff_i} v_{diff} - i_{gd} v_{gd}$$

This expression represents in particular subdividing the MMC into an input imaginary DC portion that is connected to the DC network and that is associated with the $$\sum_{i=1}^{3} 2i_{diff_i} v_{diff}$$

term, which corresponds to the power of the DC portion, and an output AC imaginary portion that is connected to the AC network and that is associated with the $i_{gd}v_{gd}$ term, which corresponds to the power of the AC portion.

The control module may include a regulator for regulating the current $i_{gd}$ and having as input a setpoint $i^*_{gd}$ corresponding to the current $i_{gd}$. The regulator servo-controls the current $i_{gd}$ by causing it to tend towards its setpoint $i^*_{gd}$. The regulation of the variable $i_{gd}$ amounts to regulating transfers of input or output AC power depending on the configuration of the converter.

The control module may include a regulator for regulating the current $i_{diff}$ and having as input a setpoint $i^*_{diff}$ corresponding to the current $i_{diff}$. The regulator servo-controls the current $i_{diff}$ by causing it to tend towards its setpoint $i^*_{diff}$. Regulating the variable $i_{diff}$ amounts to regulating the transfers of input or output DC power depending on the configuration of the converter.

In non-limiting manner, the variables $i_{gd}$ and $i_{diff}$ may be controlled independently. It can thus be understood that regulating $i_{gd}$ and $i_{diff}$ makes it possible to regulate incoming and outgoing transfers of power, and thus to control the internal energy of the converter stored in the capacitors of the submodules.

According to some embodiments of the disclosure, the control module includes a regulator for regulating the voltage across the points of common coupling between the converter and the DC power supply network, the regulator having as input the result of a comparison between a setpoint for the voltage across the points of common coupling between the converter and the DC power supply network, when squared, and a value taken from the DC power supply network, when likewise squared, and delivering a setpoint for the operating power of said converter.

By means of this regulator, it is thus possible to servo-control the voltage $v_{dc}$ across the points of common coupling between the converter and the DC power supply network by causing its value, when squared, to tend towards the setpoint $v^*_{dc}$ for the voltage across the points of common coupling between the converter and the DC power supply network, when squared.

The control module may include a member for adjusting the gain of the regulator for regulating the voltage across the points of common coupling between the converter and the DC power supply network, as a function of the value of the virtual inertia coefficient $k_{VT}$. Specifically, when the virtual energy coefficient $k_{VT}$ is adjusted so as to modify the degree of the contribution of the internal energy of the converter on the stability of the DC power supply network, the overall inertia of the MMC is modified. This has the consequence of disrupting the operation of the regulator regulating the voltage across the points of common coupling between the converter and the DC power supply network.

In particular, the adjustment of the virtual inertia coefficient has the consequence of modifying the time constant τ associated with said regulator for regulating the voltage across the points of common coupling between the converter and the DC power supply network. The member for adjusting the gain of the voltage regulator thus makes it possible to correct the changes in the time constant and in the gain of the voltage regulator that arise as a result of modifying the virtual inertia coefficient $k_{VT}$, so as to calibrate said voltage regulator.

In addition, the member for adjusting the gain of the regulator for regulating the voltage across the points of common coupling between the converter and the DC power supply network receives as input the virtual inertia coefficient $k_{VT}$ so as to adjust the gain in real time, as a function of modifications made to $k_{VT}$.

The control module may include a limiter for limiting the internal energy of the converter, the limiter having as input the internal energy of the converter, a setpoint for the maximum internal energy of the converter, and a setpoint for the minimum internal energy of the converter, and delivering a limit power setpoint.

The advantage is to be able to contain the internal energy of the converter between the maximum value $W_{\Sigma lim}^+$ for the internal energy setpoint and the minimum value $W_{\Sigma lim}^-$ for the internal energy setpoint of the converter, as defined by the operator. By keeping the internal energy of the converter between these maximum and minimum setpoint values, protection is provided in particular for the electronic switch elements, such as the transistors. Without this protection, the switch elements might be threatened by excessive voltage across the terminals of the capacitors of the submodules, while voltages that are too small across the terminals of the capacitors of the submodules could be harmful to the operation of the MMC.

In particular, the limit power setpoint delivered by the limiter is added to the operating power setpoint for the converter in order to obtain the power setpoint for the AC power supply network, thereby regulating the level of internal energy of the converter. Nevertheless, the limit power appears as a disturbance to energy control. That is why the nominal setpoint for the value of the energy stored in the capacitors of the converter as supplied to the computer may be converted for computing the internal energy setpoint $W^*_\Sigma$, e.g. by using an integral corrector.

The disclosure also provides a method of controlling a multilevel modular voltage converter, the converter serving to convert an AC voltage into a DC voltage, and vice versa, and including a DC portion for connection to a DC power supply network and an AC portion for connection to an AC power supply network, the converter having a plurality of legs, each leg comprising an upper arm and a lower arm, each arm having a plurality of submodules that are individually controllable by a control member of the submodule and comprising a capacitor connected in series in the arm when the control member of the submodule is in an ON state, each arm being suitable for being modeled by a modeled voltage source associated with a duty ratio depending on a number of capacitors connected in series in the arm, each modeled voltage source being associated in parallel with a modeled capacitor corresponding to a total capacitance of the arm, the method further comprising slow control of the converter in which the voltage across the terminals of each modeled capacitor of each leg is regulated and the voltage across the points of common coupling between the converter and the DC power supply network is regulated by controlling said control members of the submodules of the converter.

In characteristic manner, the method comprises calculating a setpoint for the internal energy of the converter stored in the capacitors of the submodules of the arms by using a function having an adjustable input parameter, and calculating a setpoint for the voltage across the terminals of each modeled capacitor from said setpoint for the internal energy of the converter, the setpoint for the voltage across the terminals of each modeled converter being used for regulating the voltage across the points of common coupling between the converter and the DC power supply network and the voltage across the terminals of each modeled capacitor.

In a variant, the adjustable input parameter is an adjustable virtual inertia coefficient $k_{VI}$.

In a variant, the setpoint $W^*_\Sigma$ for the internal energy of the converter is calculated from the following function:

$$W^*_\Sigma = \frac{1}{2} 6 C_{tot} k_{VI} (v_{dc}^2 - v_{dc0}^2) + W^*_{\Sigma 0}$$

where $C_{tot}$ is the total capacitance of the modeled capacitor in an arm, $v_{dc}$ is the measured voltage of the DC power supply network, $v_{dc0}$ is the nominal value of the voltage across the points of common coupling between the converter and the DC power supply network, and $W^*_{\Sigma 0}$ is a nominal setpoint for the value of the energy stored in the capacitors of the converter.

In a variant, the control method includes regulating the voltage across the points of common coupling between the converter and the DC power supply network by using as input the result of a comparison between a setpoint for the voltage across the points of common coupling between the converter and the DC power supply network, when squared, and a value taken from the DC power supply network, when likewise squared, and delivering a setpoint for the operating power of said converter.

In a variant, the control method includes adjusting the gain for regulating the voltage across the points of common coupling between the converter and the DC power supply network, as a function of the value of the virtual inertia coefficient.

This method makes it possible to use the various above-described embodiments of the converter.

The disclosure also provides a control module for a modular multilevel converter as defined above, the control module including a computer for computing an internal energy setpoint for the converter as stored in the capacitors of the submodules of the arms, by applying a function that has an adjustable input parameter. In addition, the control module is configured to deduce from this energy setpoint a setpoint for the voltage across the terminals of each modeled capacitor used for regulating the voltage across the points of common coupling between the converter and the DC power supply network and the voltage across the terminals of each modeled capacitor.

BRIEF DESCRIPTION OF THE DRAWINGS

The disclosure can be better understood on reading the following description of an embodiment of the disclosure given by way of non-limiting example, and with reference to the accompanying drawings, in which.

DETAILED DESCRIPTION OF THE DISCLOSURE

Figure 5:
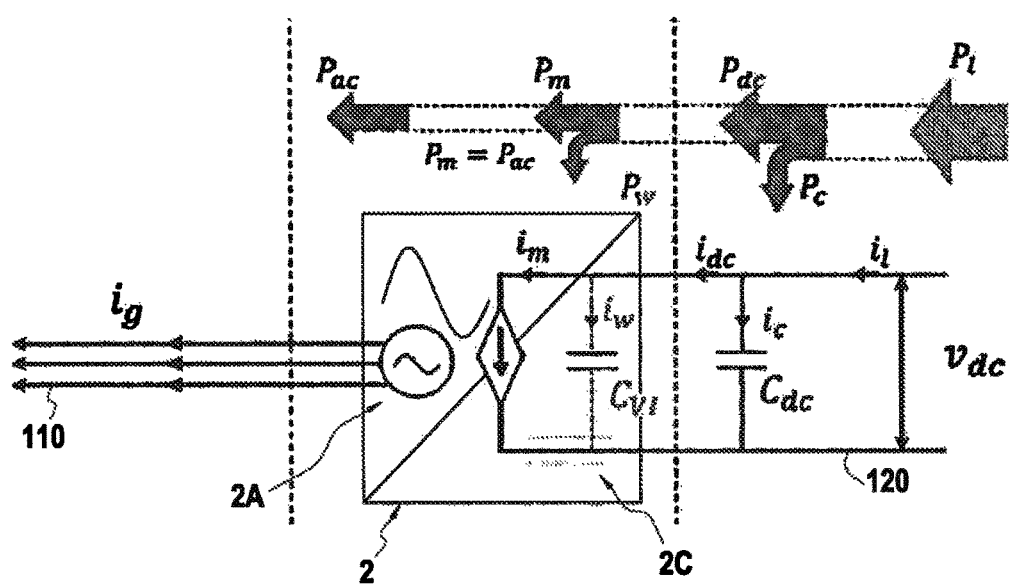
FIG. 5 is a diagrammatic representation equivalent to a modular multilevel converter of the disclosure.

The disclosure relates to a modular multilevel converter having a control module, with a circuit of equivalent behavior being shown in FIG. 5. In non-limiting manner, this figure shows an MMC 2 for converting DC energy into AC energy. In this example, it should be observed that the converter 2 has an AC portion 2A connected to the AC power supply network 110 on the left-hand side of the diagram. On the right-hand side of the diagram, it can be seen that the converter 2 has a DC portion 2C connected to the DC power supply network 120. It can be seen that a virtual capacitor $C_{VI}$ of adjustable capacitance $C_{VI}$ (by abuse of language and for reasons of simplicity, the same notation is used to designate both the capacitor and its capacitance) is associated in parallel with the DC power supply network 2C. The term "virtual" is used to mean that this capacitor is not physically present in the converter. In contrast, the control module of the disclosure makes it possible to obtain operation of the converter that is analogous to the operation that would be obtained by a converter having the virtual capacitor: the virtual capacitor $C_{VI}$ represents the behavior of the converter 2 and of its control module 4 of the disclosure.

Specifically, by regulating a virtual inertia coefficient $k_{VI}$, the stability of the DC power supply network 120 is improved and the behavior of the converter is analogous to the behavior of a converter in which a virtual capacitor $C_{VI}$ of adjustable capacitance $C_{VI}$ is connected in parallel with the DC power supply network 120.

The diagram of FIG. 5 also shows transfers of power between the converter 2 and the DC and AC power supply networks 120 and 110. Thus, $P_l$ is the power coming from other stations of the DC power supply network and symbolizes a sudden power disturbance on the DC network, $P_{dc}$ is the power extracted from the DC power supply network 120, $P_{ac}$ is the power transmitted to the AC power supply network 110, $P_c$ is the power absorbed by the capacitance $C_{dc}$ of the DC power supply network 120, $P_m$ is the operating power of the converter 2, and $P_w$ may be considered as being the power absorbed by the virtual capacitor $C_{VI}$ of adjustable capacitance $C_{VI}$. In addition, $v_{dc}$ is the voltage across the points of common coupling between the converter and the DC power supply network.

In the MMC 2 of the disclosure, and unlike the prior art MMC, surplus power from the DC power supply network 120, written $P_w$, is absorbed by the virtual converter $C_{VI}$ and enables the converter to store the internal energy $W_\Sigma$.

Figure 6:
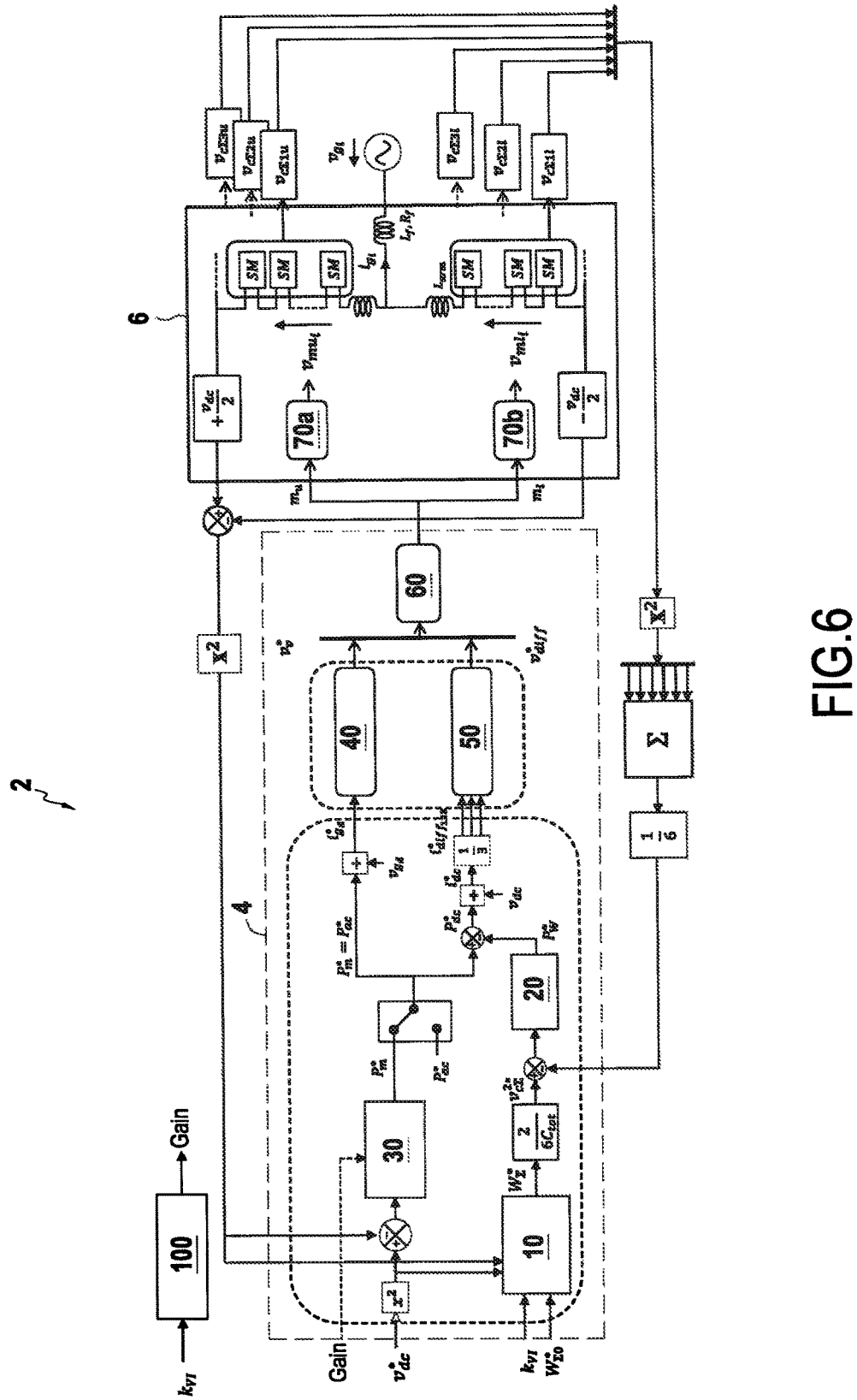
FIG. 6 shows a modular multilevel converter provided with a control module of the disclosure.

The example of FIG. 6 shows a modular multilevel converter 2 having a control module 4 of the disclosure. The MMC is configured to use closed-loop servo-control to regulate the voltage $v_{dc}$ across the points of common coupling between the converter and the DC power supply network 120 and the voltage $v_{c\Sigma}$ across the terminals of each modeled capacitor.

The control module 4 includes a computer 10 that calculates an internal energy setpoint $W^*_\Sigma$ for the converter 2 that is stored in the capacitors of the submodules of the arms on the basis of an adjustable virtual inertia coefficient $k_{VI}$, of a nominal setpoint $W^*_{\Sigma 0}$ for the value of the energy stored in the capacitors of the converter, of a measured voltage $v_{dc}$ of the DC power supply network, and of a nominal value $v_{dc0}$ for the voltage across the points of common coupling between the converter and the DC power supply network.

From the diagram of FIG. 5, it can be seen that:

$$P_l - P_{dc} = P_c = \frac{dW_{dc}}{dt} = \frac{1}{2}C_{dc}\frac{dv_{dc}^2}{dt}$$

where $W_{dc}$ is the energy of the DC power supply network.

Still with reference to FIG. 5, assuming that $P_m$ is equal to $P_{ac}$, it can also be seen that:

$$P_{dc} - P_{ac} = P_W = P_{dc} - P_m = \frac{dW_\Sigma}{dt} = \frac{1}{2}6C_{tot}\frac{dv_{c\Sigma}^2}{dt}$$

where $C_{tot}$ is the capacitance of the modeled capacitor in an arm.

By combining the above two equations, the following expression can be obtained:

$$P_l - P_m = P_c + P_W = \frac{1}{2}C_{dc}\frac{dv_{dc}^2}{dt} + \frac{dW_\Sigma}{dt}$$

This expression shows in particular that by controlling the internal energy $W_\Sigma$ of the MMC, it is possible to distribute the power $P_l - P_m$ between the capacitance $C_{dc}$ of the DC power supply network and the capacitors of the submodules of the arms.

The computer makes it possible to calculate the appropriate internal energy setpoint $W^*_\Sigma$ using the function:

$$W^*_\Sigma = \tfrac{1}{2}6C_{tot}k_{VI}(v_{dc}^2 - v_{dc0}^2) + W^*_{\Sigma 0}$$

Said internal energy setpoint $W^*_\Sigma$ of the converter makes it possible to supply a setpoint $v^*_{c\Sigma}$ for the voltage across the terminals of each modeled capacitor. This setpoint $v^*_{c\Sigma}$ for the voltage across the terminals of each modeled capacitor, when squared, is itself compared with an average of the squares of the voltages across the terminals of the modeled capacitors.

Without going beyond the ambit of the disclosure, the average may be calculated in any manner. In the non-limiting example shown in FIG. 6, the average is calculated as being the sum of the squares of the voltages of the modeled capacitors in each arm, divided by six (since the converter has six arms). The comparison is supplied to an internal energy regulator 20 of the converter, which delivers a power setpoint $P^*_w$ for the capacitors of said converter 2.

In addition, assuming that the energy regulation is sufficiently fast, the following is obtained:

$$P_l - P_m = P_c + P_W = \frac{1}{2}C_{dc}\frac{dv_{dc}^2}{dt} + \frac{1}{2}6C_{tot}k_{VI}\frac{dv_{dc}^2}{dt}$$

or indeed:

$$P_l - P_m = \frac{1}{2}(C_{dc} + C_{VI})\frac{dv_{dc}^2}{dt}$$

It is thus possible to express the virtual inertia coefficient $k_{VI}$ in the following form:

$$C_{VI} = 6C_{tot}k_{VI}$$

This expression shows that by regulating the virtual energy coefficient $k_{VI}$, it is possible to modify the value of the virtual capacitance $C_{VI}$.

In FIG. 6, it can also be seen that the control module 4 includes a regulator 30 for regulating the voltage across the points of common coupling between the converter and the DC power supply network 120, having as input the result of a comparison between the setpoint for voltage $v^*_{dc}$ across the points of common coupling between the converter and the DC power supply network, when squared, and a value $v_{dc}$ taken from the DC power supply network and that is also squared. The regulator 30 for regulating the voltage across the points of common coupling between the converter and the DC power supply network 120 delivers an operating power setpoint $P^*_m$ for said converter 2.

In addition, the control module 4 has a regulator 40 for regulating AC current $i_{gd}$ having as input a setpoint $i^*_{gd}$, and a regulator 50 for regulating the current $i_{diff}$ having as input a setpoint $i^*_{diff}$.

Figure 1:
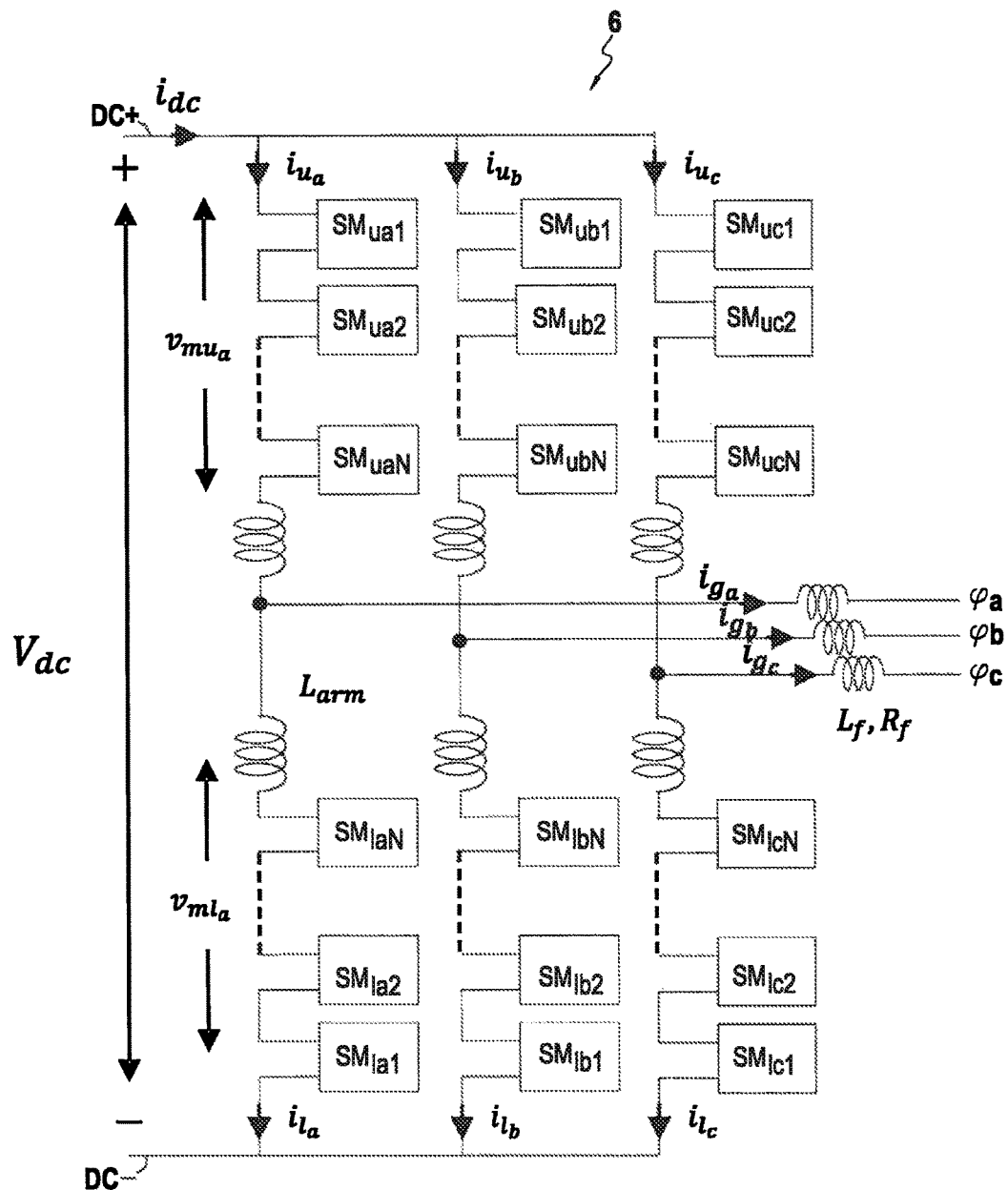
FIG. 1, described above, shows a prior art three-phase modular multilevel converter.
Figure 2:
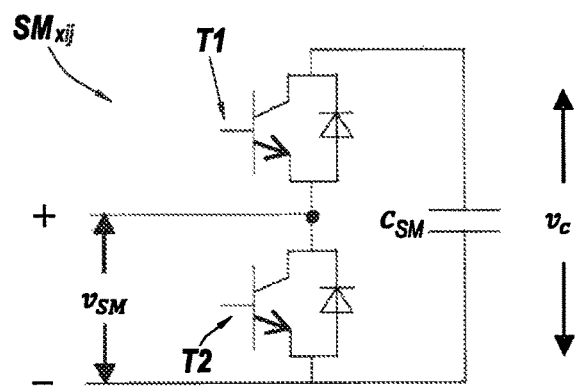
FIG. 2, described above, shows a submodule of a prior art modular multilevel converter.
Figure 3:
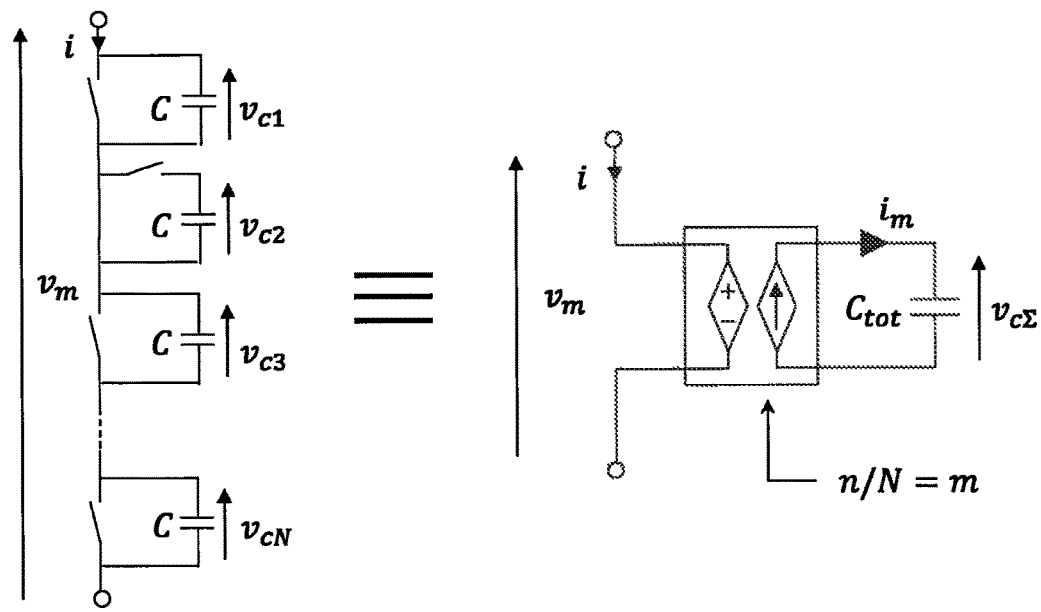
FIG. 3, described above, shows an equivalent circuit for an arm of a prior art MMC.
Figure 4:
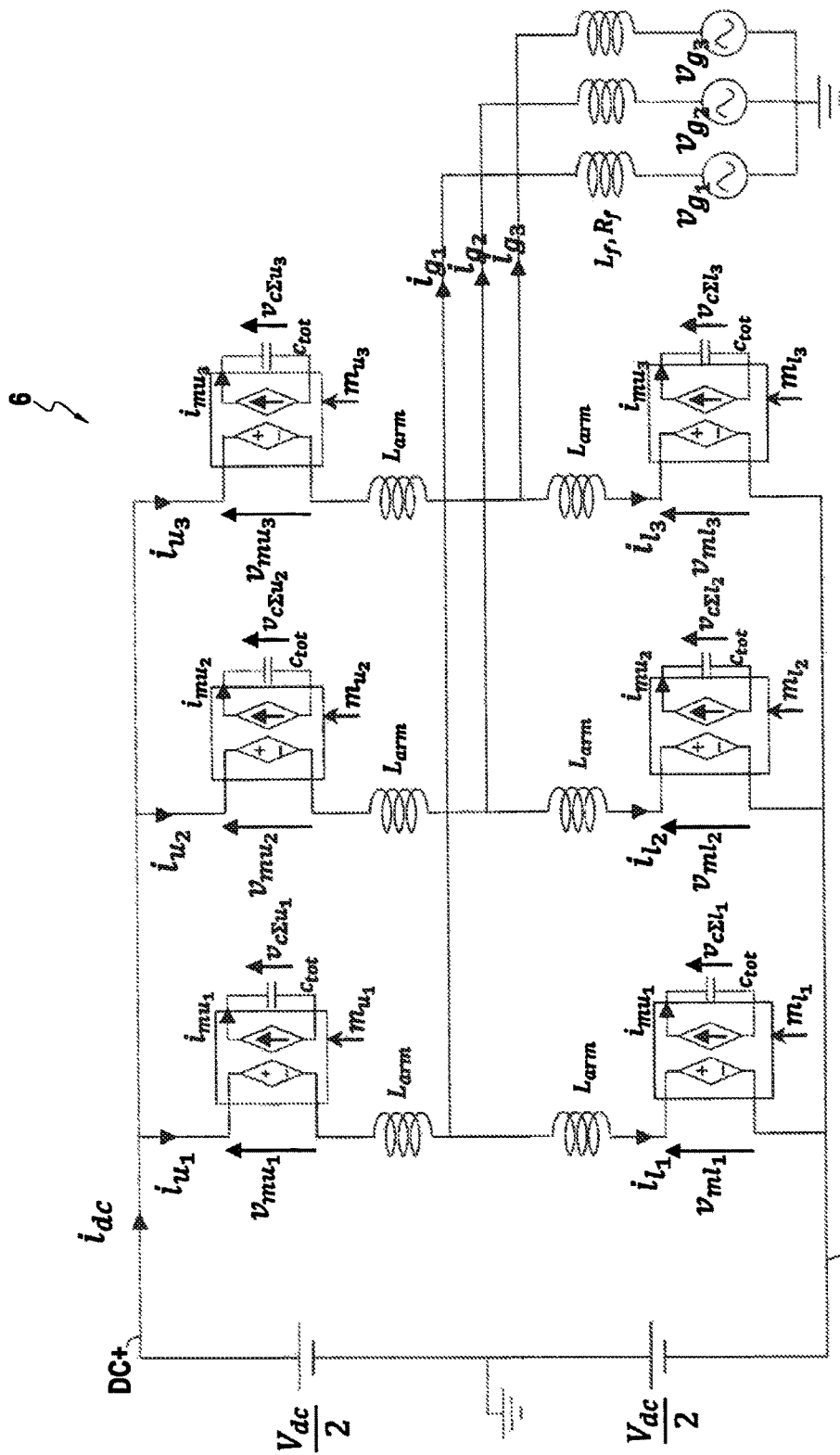
FIG. 4, described above, shows a configuration that is equivalent to a prior art modular multilevel converter.

From FIG. 3, it is known that it is possible to model the submodules of an arm by respective modeled voltage sources, each associated in parallel with a modeled capacitor, such that the modeled voltage sources have a voltage $v_{mxi}$ across their terminals (where x indicates whether the arm is an upper or lower arm and where i indicates the leg). The current regulators 40 and 50 deliver voltage setpoints $v^*_{diff}$ and $v^*_v$ that are used, following a change of variable, by a modulator member 60 and two balancing members 70a and 70b making use of a balancing control algorithm (BCA) in order to deliver the voltages $v_{mxi}$ across the terminals of the modeled voltage sources. This makes it possible to switch the submodules of the arms ON or OFF. This controls the voltage $v_{c\Sigma xi}$ across the terminals of the modeled capacitors and also the voltage $v_{dc}$ across the points of common coupling between the converter and the DC power supply network.

By varying the virtual inertia coefficient $k_{VI}$ input to the computer, it is thus possible to influence directly the voltage $v_{dc}$ of the DC power supply network and the inertia of that DC network.

In this non-limiting example, the control module 4 also has a member 100 for adjusting the gain of the regulator for regulating the voltage across the points of common coupling between the converter and the DC power supply network 120 as a function of the value $k_{VI}$ of the virtual inertia coefficient. For reasons of simplicity, this member is shown as being outside the control module 4, even though it is included in the control module 4.

Figure 7:
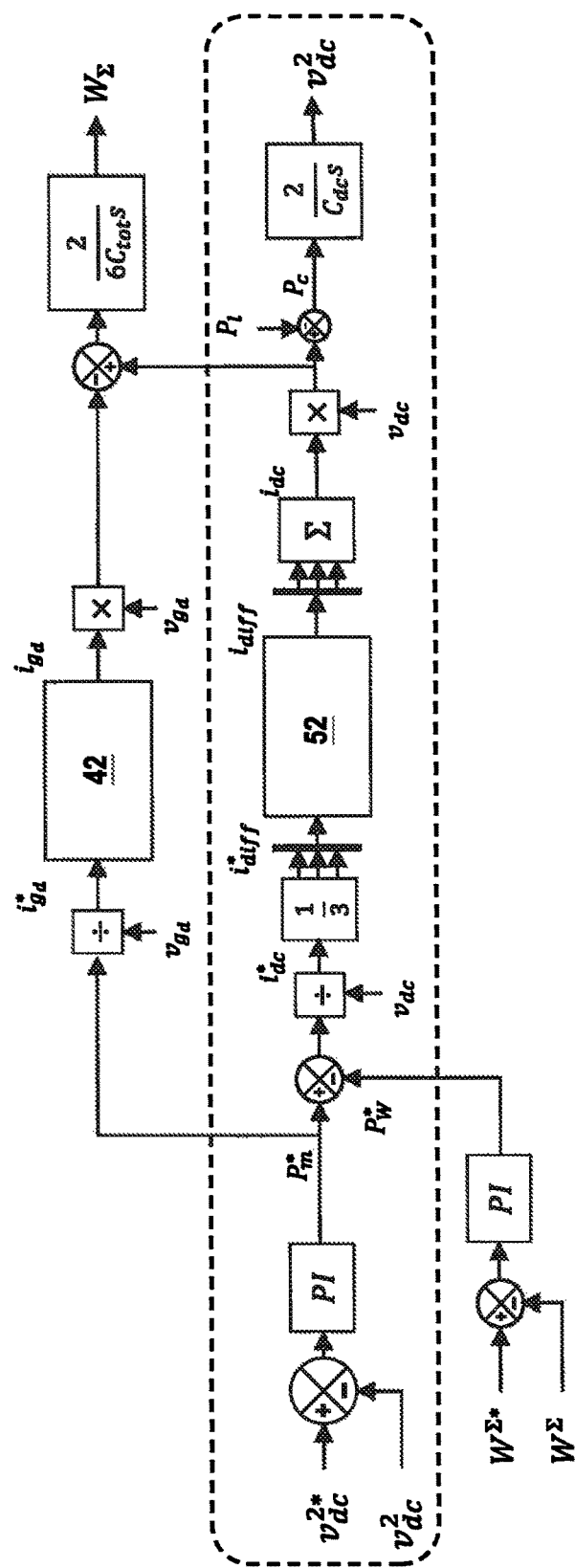
FIG. 7 shows an example implementation for adjusting the regulator for regulating the voltage across the points of common coupling between the converter and the DC power supply network.

FIG. 7 shows an example of adjusting the regulator for regulating the voltage $v_{dc}$ across the points of common coupling between the converter and the DC power supply network by using a proportional integral (PI) corrector on the servo-control loop for $v_{dc}$ and $W_\Sigma$. In this non-limiting example, the PI corrector is adjusted by a conventional pole placement method.

This circuit includes in particular loops 42 and 52 for regulating the currents $i_{diff}$ and $i_{gd}$ towards their respective setpoints $i^*_{diff}$ and $i^*_{gd}$.

Figure 8:
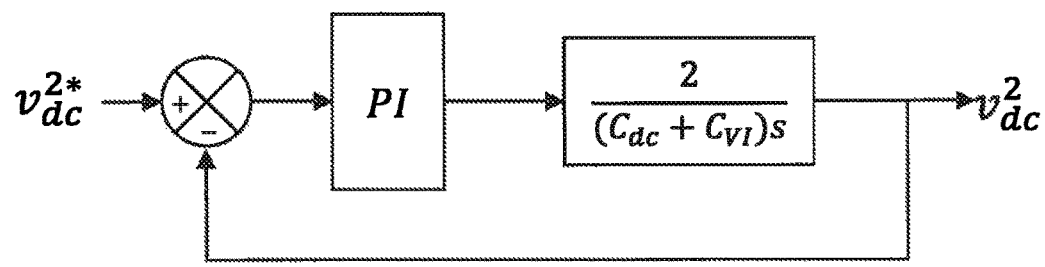
FIG. 8 shows a simplified loop for adjusting the regulator for regulating the voltage across the points of common coupling between the converter and the DC power supply network.

By simplifying, it is possible to obtain an equivalent representation of the loop for regulating the voltage across the points of common coupling between the converter and the DC power supply network 120 with adjustment of the regulator of said voltage across the points of common coupling between the converter and the DC network using a PI corrector. Such a representation is given in FIG. 8.

FIGS. 9A to 9D show the results of a simulation of the behavior of a modular multilevel converter 2 having a control module 4 of the disclosure, and in particular a simulation by controlling power. In this simulation, a test system is created in which the DC portion of the converter is connected to an ideal DC power source, simulating a DC power supply network 120, while the AC portion of the converter is connected to an AC power source, simulating an AC power supply network 110. A power step is then imposed on the simulated AC network, the virtual inertia coefficient $k_{VI}$ is varied, and the results on other magnitudes of the system are observed.

Figure 9A:
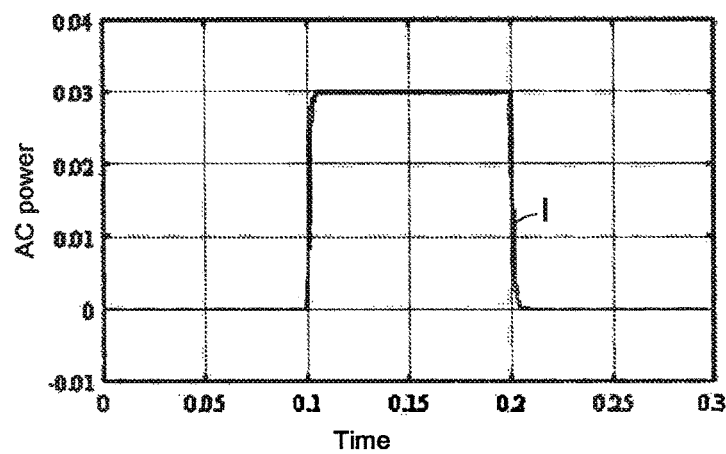
FIG. 9A shows a power step imposed on an AC network for simulating the operation of the converter of the disclosure.

As can be seen in FIG. 9A, the curve l represents a power step of 0.03 per unit (pu) imposed on the simulated AC network for 0.1 seconds (s) prior to bringing the AC power back to its initial zero value. This behavior simulates a transfer of active power from the MMC 2 to the AC power supply network 110.

Figure 9B:
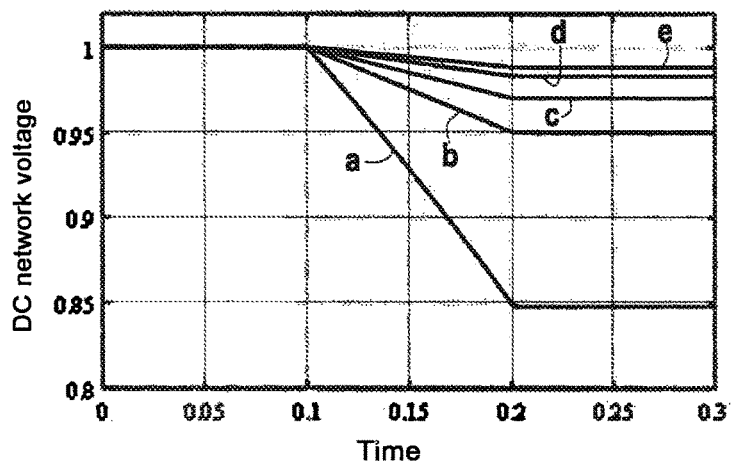
FIG. 9B shows the voltage response of a DC network to a power step on the AC network as a function of time for different values of $k_{VI}$.

The voltage response of the simulated DC network for different values of $k_{VI}$ is shown in FIG. 9B. Each of these curves corresponds to a value of $k_{VI}$ such that the curves a, b, c, d, and e correspond to $k_{VI}$ having respective values equal to 0, 0.5, 1, 2, and 3. It can be observed that for greater values of $k_{VI}$, the variations in the simulated DC network are smaller. This agrees with the principle of the disclosure, since by increasing $k_{VI}$, the inertia of the converter is increased, thereby enabling the DC network to contain the disturbances better and to stabilize the voltage of the DC network.

Figure 9C:
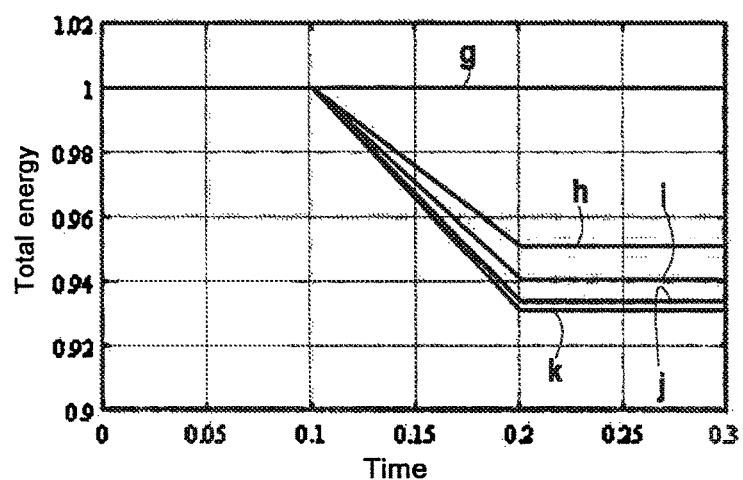
FIG. 9C shows the variation in the total energy of a converter in response to a power step on the AC network, as a function of time and for different values of $k_{VI}$.

FIG. 9C shows the variation in the total energy of the converter for several values of $k_{VI}$. The curves g, h, i, j, and k correspond to $k_{VI}$ having respective values equal to 0, 0.5, 1, 2, and 3. By increasing the virtual inertia coefficient $k_{VI}$, the value of the virtual capacitance is increased, thereby implying that the contribution of the converter increases and that more energy is extracted from the virtual capacitor. This increase in the contribution of the energy of the converter thus leads to a drop in the total energy of the converter when increasing the virtual inertia coefficient.

Figure 9D:
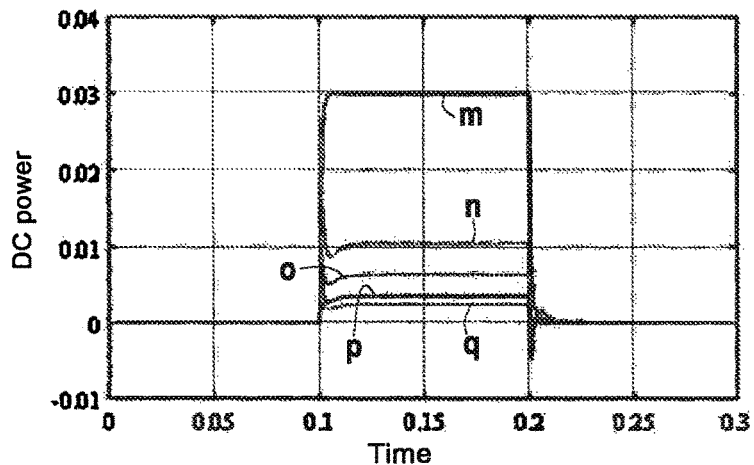
FIG. 9D shows the power response of a DC network to a power step on an AC network as a function of time for different values of $k_{VI}$.

The consequence of this can be seen in FIG. 9D, which shows how power varies on the simulated DC network as a function of values for the virtual inertia coefficient $k_{VI}$. In this example, the curves m, n, o, p, and q correspond to $k_{VI}$ having respective values equal to 0, 0.5, 1, 2, and 3. It can be seen that when the value of the virtual inertia coefficient $k_{VI}$ increases, the impact on the power of the simulated DC network of the variation of power in the simulated AC network is reduced. In particular, less energy is extracted from the capacitors of the DC power supply network. This is due to the fact that more energy is extracted from the virtual capacitor. The virtual capacitance serves to stabilize and improve the inertia of the DC network.

FIGS. 10A to 10D show a simulation by controlling the voltage across the points of common coupling between the converter and the DC network, in which the behaviors of two systems are compared. The first system consists in a modular multilevel converter of the disclosure, configured as in the above simulation. The virtual inertia coefficient is adjusted and set so that $k_{VI}=1$. The second system consists in a prior art MMC in which the DC portion is likewise connected to an ideal DC power source, while the AC portion of the converter is connected to an AC voltage source. In this second system, a real capacitor is connected in parallel with the simulated DC network. The value of the capacitance of this real capacitor is selected to be equal to the capacitance of the virtual capacitor $C_{VI}$ of the first system. The comparison is thus between the influences of a virtual capacitor $C_{VI}$ and of a real capacitor associated with an MMC, in parallel with a simulated DC network.

Figure 10A:
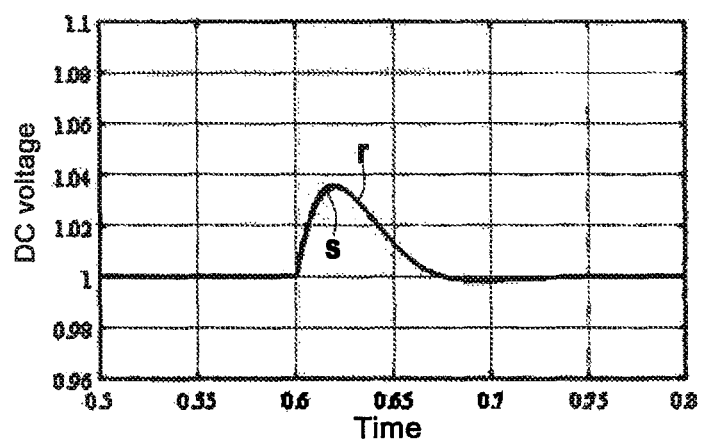
FIG. 10A shows the voltage response of a DC network for a first simulation system consisting in an MMC of the disclosure having a virtual capacitance and for a second simulation system consisting in a prior art converter having a real capacitor in parallel with the DC network.
Figure 10B:
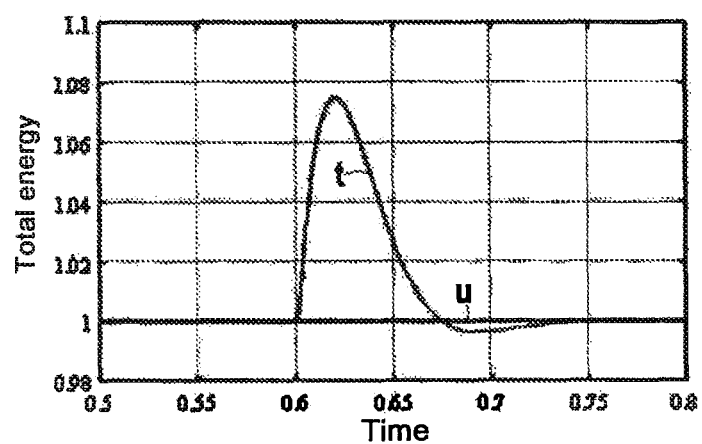
FIG. 10B shows the variations in the total energy of the converter for the two simulation systems.
Figure 10C:
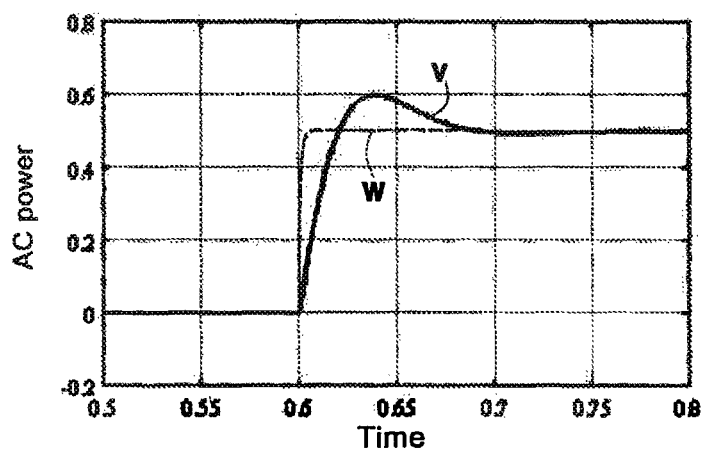
FIG. 10C shows the power response on the AC network for the two simulation systems.
Figure 10D:
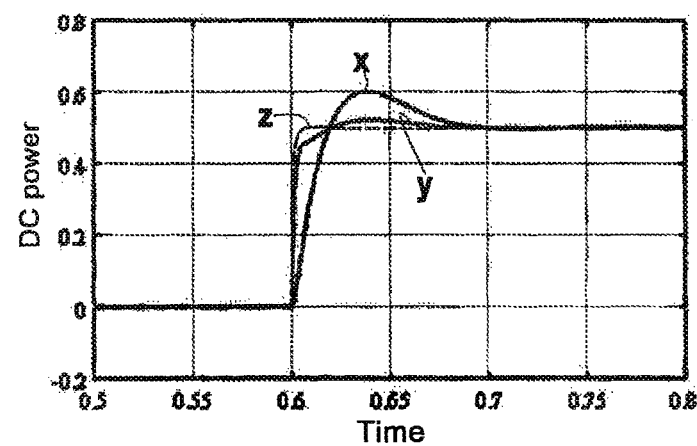
FIG. 10D shows the power response on the DC network for the two simulation systems.

A power disturbance step is imposed by the DC power source on both systems, as can be seen in dashed-line curve z in FIG. 10D.

In FIG. 10A, curves r and s represent the variation in the voltage of the simulated DC network for the first and second systems respectively. It can be seen that the variation in the voltage of the simulated DC network is the same for both systems.

Since those systems are configured so that the values of the real and virtual capacitances are equal, the power response of the simulated AC network is the same for both systems. In FIG. 10C, this response is represented by the curve v, while the curve w represents the power disturbance step on the simulated DC network.

By means of curve t, FIG. 10B shows an increase in the total energy in the first system having a virtual capacitance, representing the energy stored in the virtual capacitor. In contrast, in the second system, which is represented by the curve u, no variation can be observed in the total energy, given that for this converter there is no internal energy contribution to the simulated DC network.

In FIG. 10D, curves y and x represent the simulated DC network power for the first and second systems respectively, and it can be seen that the presence of a virtual capacitance improves the power response to a power disturbance on the simulated network, as represented by the curve z. The disturbance thus has less impact on the simulated DC network and the power of said DC network is controlled better.

Figure 11:
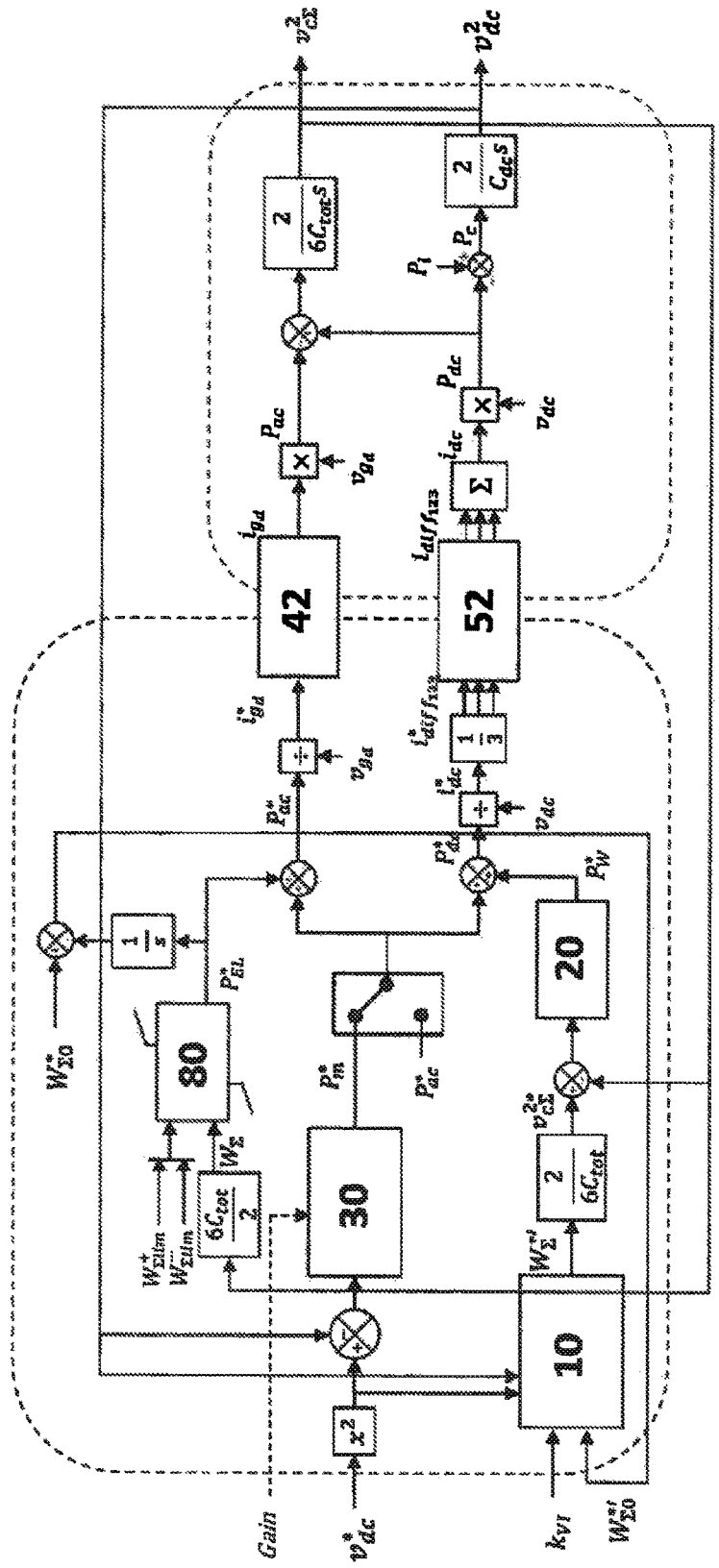
FIG. 11 shows an MMC of the disclosure in which the control module is provided with a limiter for limiting the internal energy of the converter.

A variant of the converter of the disclosure is shown in FIG. 11, in which the control module includes an energy limiter 80 that receives as input the internal energy $W_\Sigma$ of the converter, a maximum internal energy setpoint $W_{\Sigma lim}^+$ for the converter, and a minimum internal energy setpoint $W_{\Sigma lim}^-$ for the converter. The energy limiter 80 delivers a limit power setpoint $P^*_{EL}$ associated with a limit power $P_{EL}$. This energy limiter serves to put a bound on the internal energy $W_\Sigma$ between the maximum and minimum internal energy setpoint values for the converter.

The limit power $P_{EL}$ appears as a disturbance on the energy control. The nominal setpoint $W^*_{\Sigma 0}$ of the value for the energy stored in the capacitors of the converter is thus corrected so as to provide the computer 10 for computing the internal energy setpoint with a corrected nominal setpoint $W^{*\prime}_{\Sigma 0}$ for the value of the energy stored in the capacitors.

This gives:

$$P_{ac} = P_m + P_{EL}$$

such that:

$$P_l - P_m - P_{EL} = P_c + P_W = \frac{1}{2}C_{dc}\frac{dv_{dc}^2}{dt} + \frac{dW_\Sigma}{dt}$$

Furthermore, the corrected nominal setpoint $W^{*\prime}_{\Sigma 0}$ for the value of the energy stored in the capacitors is expressed as follows:

$$W^{\prime*}_\Sigma = \tfrac{1}{2}6C_{tot}k_{VI}(v_{dc}^2 - v_{dc0}^2) + W^{\prime*}_{\Sigma 0}$$

By substituting in the above equations, the following is obtained:

$$P_l - P_m - P_{EL} = \frac{1}{2}C_{dc}\frac{dv_{dc}^2}{dt} + \frac{1}{2}6C_{tot}k_{VI}\frac{dv_{dc}^2}{dt} - P_{EL}$$

I.e.:

$$P_l - P_m = \frac{1}{2}(C_{dc} + C_{VI})\frac{dv_{dc}^2}{dt}$$

It can thus be seen that the energy limiter 80 does not modify the behavior of the converter within the maximum and minimum internal energy limits. The behavior of the converter is analogous to the behavior of a converter in which a virtual capacitor $C_{VI}$ of adjustable capacitance $C_{VI}$ is connected in parallel with the DC power supply network 120.

The invention claimed is:

1. A multilevel modular voltage converter for converting AC voltage into DC voltage and DC voltage into AC voltage, the converter comprising:
    a DC portion configured to be connected to a DC power supply network; and
    an AC portion configured to be connected to an AC power supply network;
    a plurality of legs, each of said legs comprising an upper arm and a lower arm, each of said upper arms and lower arms comprising a plurality of submodules that are individually controllable by a control member specific to each of said submodules,
    wherein, in each of said upper arms and lower arms, each of said submodule comprises a capacitor that is connected in series in the respective arm when the control member of the submodule is in an ON state, each of said upper arms and lower arms being configured to model as a modeled voltage source associated with a duty ratio depending on a number of capacitors connected in series in the respective arm, each modeled voltage source being in parallel with a modeled capacitor corresponding to a total capacitance of the respective arm,
    wherein the converter further comprises a converter control module configured to regulate a voltage across terminals of each modeled capacitor of each leg and to regulate a voltage at connecting points between the converter and the DC power supply network by controlling said control members of the submodules of the converter,
        wherein the control module of the converter comprises a computer that computes a setpoint for an internal energy of the converter stored in the capacitors of the submodules of each of said upper arms and lower arms by applying a function having an adjustable input parameter, the control module being configured to deduce, from said setpoint for the internal energy, a setpoint for a voltage across the terminals of each modeled capacitor used for regulating the voltage at the connecting points between the converter and the DC power supply network and the voltage across the terminals of each modeled capacitor.

2. The converter according to claim 1, wherein the adjustable input parameter is an adjustable virtual inertia coefficient $k_{VI}$.

3. The converter according to claim 2, wherein the computer is configured to compute the internal energy setpoint $W^*_\Sigma$ for the converter using a function:

$$W^*_\Sigma = \frac{1}{2}6C_{tot}k_{VI}(v_{dc}^2 - v_{dc0}^2) + W^*_{\Sigma 0}$$

where $C_{tot}$ is a total capacitance of a modeled capacitor in one of said upper arms or lower arms, $v_{dc}$ is a measured voltage of the DC power supply network, $v_{dc0}$ is a nominal value of the voltage at the connecting points between the converter and the DC power supply network, and $W^*_{\Sigma 0}$ is a nominal setpoint for a value of an energy stored in the capacitors of the submodules of each of said upper arms and lower arms of the converter.

4. The converter according to claim 1, wherein the control module includes a regulator for regulating an internal energy of the converter, the regulator having as input a squared result of a comparison between said setpoint for the voltage across the terminals of each modeled capacitor and an average of squares of the voltages across the terminals of the modeled capacitors, and delivering a power setpoint for the capacitors of said converter.

5. The converter according to claim 1, wherein the control module is configured to perform a change of variable in order to control intermediate current and voltage variables $i_{diff}$, $i_{gd}$ and $v_{diff}$, $v_{gd}$, where $i_{diff}$ and $v_{diff}$ are associated with the DC power supply network and $i_{gd}$ and $v_{dg}$ are associated with the AC power supply network.

6. The converter according to claim 5, wherein the control module includes a regulator for regulating a current $i_{gd}$ and having as input a setpoint $i^*_{gd}$ corresponding to the current $i_{gd}$.

7. The converter according to claim 5, wherein the control module includes a regulator for regulating a current $i_{diff}$ and having as input a setpoint $i^*_{diff}$ corresponding to the current $i_{diff}$.

8. The converter according to claim 1, wherein the control module includes a regulator for regulating the voltage at the connecting points between the converter and the DC power supply network, the regulator having as input a squared result of a comparison between a setpoint for the voltage across the points of common coupling between the converter and the DC power supply network and a squared value taken from the DC power supply network, and delivering a setpoint for an operating power of said converter.

9. The converter according to claim 8, wherein the adjustable input parameter is an adjustable virtual inertia coefficient $k_{VI}$ and wherein the control module includes a member for adjusting a gain of the regulator for regulating the voltage at the connecting points between the converter and the DC power supply network, as a function of a value of the virtual inertia coefficient $k_{VI}$.

10. The converter according to claim 1, wherein the control module includes a limiter for limiting an internal energy of the converter, the limiter having as input the internal energy of the converter, a setpoint for a maximum internal energy of the converter, and a setpoint for a minimum internal energy of the converter, and delivering a limit power setpoint.

11. A method of controlling a multilevel modular voltage converter, the converter serving to convert AC voltage into DC voltage and DC voltage into AC voltage, said converter including a DC portion configured to be connected to a DC power supply network and an AC portion configured to be connected to an AC power supply network, the converter having a plurality of legs, each of said legs comprising an upper arm and a lower arm, each of said upper arms and lower arms having a plurality of submodules that are individually controllable by a control member specific to each of said submodules, and in each of said upper arms and lower arms, each of said submodules comprising a capacitor that is connected in series in the respective arm when the control member of the submodule is in an ON state, each of said upper arms and lower arms being configured to model as a modeled voltage source associated with a duty ratio depending on a number of capacitors connected in series in the respective arm, each modeled voltage source being in parallel with a modeled capacitor corresponding to a total capacitance of the respective arm, the method further comprising:

controlling of the converter, in which a voltage across terminals of each modeled capacitor of each leg is regulated and a voltage at connecting points between the converter and the DC power supply network is regulated by controlling said control members of the submodules of the converter, calculating a setpoint for an internal energy of the converter stored in the capacitors of the submodules of each of said upper arms and lower arms by using a function having an adjustable input parameter, and calculating a setpoint for the voltage across the terminals of each modeled capacitor from said setpoint for the internal energy of the converter, the setpoint for the voltage across the terminals of each modeled capacitor being used for regulating the voltage at the connecting points between the converter and the DC power supply network and the voltage across the terminals of each modeled capacitor.

12. The method according to claim 11, wherein an adjustable input parameter is an adjustable virtual inertia coefficient $k_{VI}$.

13. The method according to claim 12, wherein the setpoint $W^*_\Sigma$ for the internal energy of the converter is calculated from a function:

$$W^*_\Sigma = \frac{1}{2} 6 C_{tot} k_{VI} (v^2_{dc} - v^2_{dc0}) + W^*_{\Sigma 0}$$

where $C_{tot}$ is a total capacitance of the modeled capacitor in one of said upper arms or lower arms, $v_{dc}$ is a measured voltage of the DC power supply network, $v_{dc0}$ is a nominal value of the voltage at the connecting points between the converter and the DC power supply network, and $W^*_{\Sigma 0}$ is a nominal setpoint for a value of an energy stored in the capacitors of the submodules of each of said upper arms and lower arms of the converter.

14. The method according to claim 11, further comprising regulating the voltage at the connecting points between the converter and the DC power supply network by using as input a squared result of a comparison between a setpoint for the voltage at the connecting points between the converter and the DC power supply network and a squared value taken from the DC power supply network, and delivering a setpoint for an operating power of said converter.

15. The method according to claim 11, further comprising adjusting a gain for regulating the voltage at the connecting points between the converter and the DC power supply network, as a function of the value of the virtual inertia coefficient.

16. A control module for controlling a multilevel modular voltage converter, the converter being configured for converting AC voltage into DC voltage and DC voltage into AC voltage, the converter comprising a DC portion configured to be connected to a DC power supply network and an AC portion configured to be connected to an AC power supply network, the converter comprising a plurality of legs, each of said legs comprising an upper arm and a lower arm, each of said upper arms and lower arms comprising a plurality of submodules that are individually controllable by a control member specific to each of said submodules, and in each of said upper arms and lower arms, each of said submodules comprising a capacitor that is connected in series in the respective arm when the control member of the submodule is in an ON state, each of said upper arms and lower arms being configured to model as a modeled voltage source associated with a duty ratio depending on a number of capacitors connected in series in the respective arm, each modeled voltage source being in parallel with a modeled capacitor corresponding to a total capacitance of the respective arm, wherein said control module is included in said converter, and said control module is configured to regulate a voltage across terminals of each modeled capacitor of each leg and to regulate a voltage at connecting points between the converter and the DC power supply network by controlling said control members of the submodules of the converter, wherein said control module comprises a computer that computes a setpoint for an internal energy of the converter stored in the capacitors of the submodules of each of said upper arms and lower arms by applying a function having an adjustable input parameter, and wherein said control module is configured to deduce, from said setpoint for the internal energy, a setpoint for a voltage across the terminals of each modeled capacitor used for regulating the voltage at the connecting points between the converter and the DC power supply network and the voltage across the terminals of each modeled capacitor.

* * * * *

UNITED STATES PATENT AND TRADEMARK OFFICE
CERTIFICATE OF CORRECTION

PATENT NO. : 10,312,824 B2
APPLICATION NO. : 15/749829
DATED : June 4, 2019
INVENTOR(S) : Shinoda et al.

Page 1 of 1

It is certified that error appears in the above-identified patent and that said Letters Patent is hereby corrected as shown below:

On the Title Page

Item (71), Line 6, Change "CENTRALSUPELEC" to –CENTRALESUPELEC–

Signed and Sealed this
Tenth Day of September, 2019

Andrei Iancu
*Director of the United States Patent and Trademark Office*